United States Patent
Menges et al.

(10) Patent No.: US 6,349,342 B1
(45) Date of Patent: Feb. 19, 2002

(54) METHODS AND APPARATUS FOR MANAGING COMPUTER PROCESSES

(75) Inventors: Anthony W. Menges, San Jose; Kenneth M. Cavanaugh, III, Montara; David M. Brownell; Robert B. Hagmann, both of Palo Alto; Dwight F. Hare, La Selva Beach; Peter Vanderbilt, Mountain View, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/835,994

(22) Filed: Apr. 11, 1997

Related U.S. Application Data

(63) Continuation of application No. 08/408,645, filed on Mar. 22, 1995, now abandoned.

(51) Int. Cl.$^7$ ................................................ G06F 9/44

(52) U.S. Cl. ........................ 709/316; 709/317; 709/313; 709/107

(58) Field of Search ................................ 395/680, 683, 395/182; 709/300, 303, 302, 100, 101, 102, 105, 106, 107, 310, 311, 313, 316, 317, 315, 314

(56) References Cited

U.S. PATENT DOCUMENTS

| 5,187,790 A | * | 2/1993 | East et al. ................... 395/725 |
| 5,544,316 A | * | 8/1996 | Carpenter et al. ........ 395/200.3 |

FOREIGN PATENT DOCUMENTS

| EP | 0474339 | * 11/1992 | ............. G06F/9/44 |

OTHER PUBLICATIONS

Wayne Eckerson, Unifying Objects, Network World, pg. No. : 1, Jun. 21, 1993.*
The Design of the Unix Operating System, Maurice J. Bach, Prentice Hall, Jan. 1990.*
SOMobjects Developer Toolkit Users Guide Version 2.0, IBM, pg 6–30–6–50, Jun. 1993.*

(List continued on next page.)

*Primary Examiner*—Majid A. Banankhah
(74) *Attorney, Agent, or Firm*—Beyer, Weaver & Thomas LLP

(57) ABSTRACT

A number of methods, apparatus, and data structures are disclosed for managing computer processes. In one aspect, a daemon process which manages server processes includes an active server table and a locator service. The locator service can look up and register server processes in the active server table. Furthermore, the locator service can start up server processes. In some embodiments, the locator service includes a look-up object and a server process registration object which perform the tasks of the locator service. In other embodiments, methods for managing server process such as starting and registering the server processes are taught. In one specific method, a daemon process performs a variety of steps in response to receiving a look-up call for a target object. These steps include obtaining a server identifier for the target object, determining the state of a server process, and returning addressing information corresponding to the server process under which the target object will activate. In related method aspects the daemon process will start the server process if it isn't running and/or wait until the server process is running to return the addressing information. In a separate method aspect, a server process self-starts; receiving an object reference for a desired target object, receiving a server process identification number, creating a communications port for itself, forming addressing information for itself, obtaining an object reference for a server process registration object, and registering itself by calling the server process registration object to invoke a register new process operation.

34 Claims, 10 Drawing Sheets

OTHER PUBLICATIONS

IBM Technical Disclosure Bulletin, vol. 37, No. 7, Jul. 1994, New York, US, pp. 539–542, XP002009565, "Distributed Object Activation and Communication Protocols".

Operating Systems Review (SIGOPS), vol. 27, No. 5, Dec. 1, 1993, pp. 217–230, XP000418695, p. 219, Birrell A. et al., "Network Objects".

* cited by examiner

METHODS AND APPARATUS FOR MANAGING COMPUTER PROCESSES

This is a continuation of application Ser. No. 08/408,645 filed Mar. 22, 1995, now abandoned.

BACKGROUND OF THE INVENTION

The present invention relates to the fields of distributed computing systems, client-server computing and object-oriented programming. More specifically, the present invention teaches methods, apparatus, and data structures for managing computer processes.

Object oriented programming methodologies have received increasing attention over the past several years in response to the growing tendency for software developed using traditional programming methods to be delivered late and over budget. This stems from the fact that traditional programming techniques which emphasize procedural models and "linear" code tend to be difficult to design and maintain in many circumstances. Generally, large programs created using traditional methods are "brittle", That is, even small changes can effect numerous elements of the programming code. Thus, minor changes made to the software in response to user demands can require major redesign and rewriting of the entire program.

Object oriented programming strategies tend to avoid these problems because object methodologies focus on manipulating data rather than procedures; thus providing the programmer with a more intuitive approach to modeling real world problems. In addition objects encapsulate related data and procedures so as to hide that information from the remainder of the program by allowing access to the data and procedures only through the object's interface. Hence changes to the data and or procedures of the object are relatively isolated from the remainder of the program. This provides code that is more easily maintained as compared to code written using traditional methods, as changes to an object's code do not affect the code in the other objects. In addition, the inherent modular nature of objects allows individual objects to be reused in different programs. Thus, programmers can develop libraries of "tried and true" objects that can be used over and over again in different applications. This increases software reliability while decreasing development time, as reliable programming code may be used repeatedly.

A more recent advance in the field of object oriented methodologies has been the implementation of distributed object operating environments over computers interconnected via a computer network. As used herein, the term "distributed object" or "object" refers to an encapsulated package of code and data that can be manipulated by operations through an interface. Thus, distributed objects will be seen by those skilled in the art of object oriented programming (OOP) as including the basic properties that define traditional programming objects. However, distributed objects differ from traditional programming objects by the inclusion of two important features. First, distributed objects are multilingual. That is, the interfaces of distributed objects are defined using an interface definition language that can be mapped to a variety of different programming languages. One such interface definition language is IDL. Second, distributed objects are location-independent, i.e., distributed objects can be located anywhere in a network. This contrasts sharply with traditional programming objects which typically exist in a single address space.

Distributed objects can be object clients or object servers, depending upon whether they are sending requests to other objects or replying to requests from clients. In a distributed object environment, requests and replies are made through an Object Request Broker (ORB) that is aware of the locations and status of the objects. One architecture which is suitable for implementing such an ORB is provided by the Common Object Request Broker Architecture (CORBA) specification. The CORBA specification was developed by the Object Management Group (OMG) to define the distributed computing environment world in terms of objects in a distributed client-server environment, where server objects are capable of providing services to clients requesting the service. In the following discussion, the terms "object" and "distributed object" will be used interchangeably.

When a client calls a target object, certain procedures must be performed to ensure that the target object can perform the requested service(s). These procedures include identifying and locating the target object, starting the server process (if necessary) under which the target object resides, activating the target object if necessary, and, finally, establishing a connection with the target object and passing the call. The ORB would be ideal for managing server processes at all stages, including starting and registering the server processes. What is needed is a framework for managing server processes under a distributed object operating environment.

SUMMARY OF THE INVENTION

To achieve the foregoing and other objectives and in accordance with the purpose of the present invention, methods, apparatus and data structures for managing computer processes are taught. According to one aspect of the invention a daemon process running on a host computer system in a distributed object operating environment includes an active server table and a locator service. The active server table has a data structure for maintaining entries related to a multiplicity of server processes that are currently running on the host computer. These entries include a server identifier, a server process state, and server process addressing information. The locator service accesses the active server table to provide addressing information about the server processes to a client requesting this information. Furthermore, the locator service registers server processes into the active server table.

In one embodiment, the daemon process also has an object adapter database resident therein. In additional embodiments, the object adapter database is resident elsewhere in the distributed object operating environment. One specific embodiment has the object adapter database in a separate process running on the host computer. The object adapter database includes data elements such as target object identifiers, server identifiers each corresponding to at least one target object identifier, and object references, each object reference corresponding to a target object identifier. In further embodiments, the locator service includes two objects, a locator object and a server process registration object. The locator object performs the server look-up function, and the server process registration object performs the server process registration function. A still further embodiment is contemplated wherein a distributed object operating environment includes a multiplicity of computer systems connected by a network with a distinct daemon process as described above running on each one of the computer systems.

In a separate aspect of the present invention, a computer system for use in a distributed object operating environment is contemplated. The computer system includes a central processing unit, memory accessed by the central processing unit, and a locator service implemented on the computer system. A plurality of distributed objects reside in the memory. The locator service manages the distributed objects and any server processes executing on the computer system. In several related embodiments, the computer system will have means for performing the method aspects of the invention as described below.

In other aspects of the invention various methods for managing server processes such as starting and registering server processes are disclosed. These server processes reside on a server host computer. In a first method, a daemon process resident on the server host computer performs the steps of receiving a look-up call for a target object, obtaining a server identifier for said target object, determining a state of a server process, and returning addressing information corresponding to said server process. The server process is uniquely defined within the server host computer by way of the server identifier. In one method aspect, the server process state is determined to be running and, as a result, the step of returning said addressing information is performed immediately. In another method aspect, the state is determined to be starting and, as a result, the daemon process waits until the state transitions from starting to running before returning the addressing information.

In another method aspect, the step of obtaining a server identifier for the target object is performed by accessing a first database. By way of example, the first database may be an object adapter database. Furthermore, the state of the server process is determined by looking it up in a second database. In one example, the second database may be an active server table. In another embodiment, the first and the second databases are the same database.

In a still further method aspect, when the state of the process is determined to be not active (i.e. the server process is not found in the second database), the daemon process creates a server process entry in the second database. This entry includes a server identifier and a server process state. The daemon process then continues by marking the server process state as starting, accessing the first database to get an execdef for the target object, starting the server process using the execdef, and waiting until the server process state transitions from starting to running before returning the server process addressing information to the client. By way of example, the execdef may be the server's program name and any necessary arguments.

In yet another method aspect, the server process responds to being started by obtaining a server process identification number from the operating system of the host computer. Then it creates a communications port for the server process, forms addressing information for the server process, and then calls a server process registration object resident in the daemon process. The operation of this call will invoke a register server operation. As arguments to this call, the server process passes the addressing information, the server process identification number, and the server identifier. In response to this call, the server process registration object stores the addressing information in the second database and marks the server process state entry as running.

In another separate aspect of the invention, a self-start method for a server process (i.e. self-start and register) is taught. The method begins when the server process receives a request to become a server along with an object reference for the desired target object. In response the server process begins executing and obtains a server process identification number from the operating system of the host computer.

Next it performs the steps of creating a communications port for the server process, forming addressing information for the server process, obtaining an object reference for a server process registration object from an object request broker object file and calling the server process registration object to invoke a register new server operation. Then, in response to this call, the server process receives a server identifier corresponding to itself.

BRIEF DESCRIPTION OF THE DRAWINGS

The invention, together with further objectives and advantages thereof, may best be understood by reference to the following description taken in conjunction with the accompanying drawings in which.

DESCRIPTION OF THE INVENTION

Figure 1:
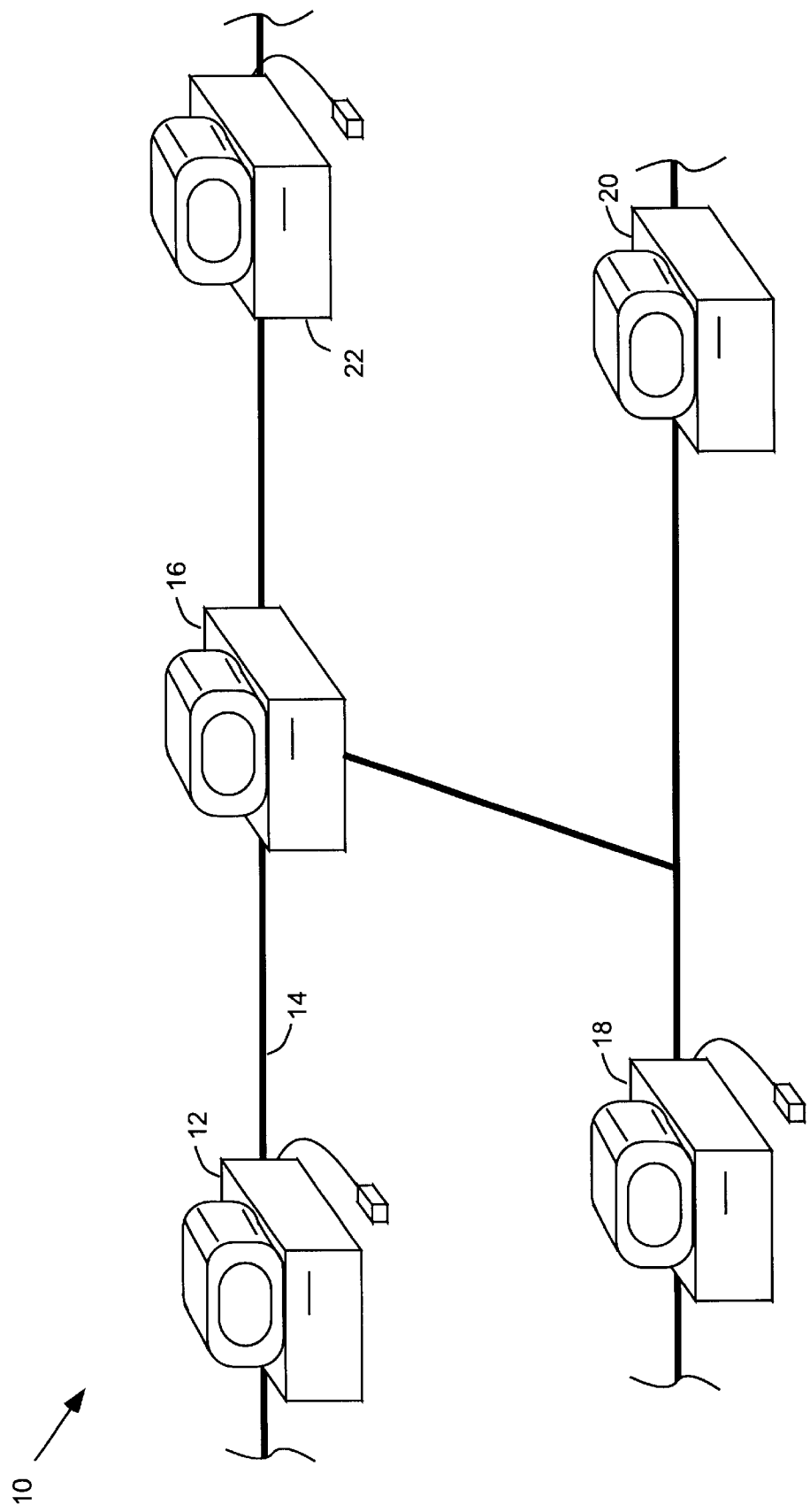
FIG. 1 is a pictorial illustration of various computers linked together in a computer network.

The present invention relates to a distributed operating environment based on object oriented programming (OOP). More specifically, this invention discloses methods, apparatus, and data structures for managing computer processes. In the following discussion, the methods and apparatus will be discussed in more detail, first through discussing example computer systems which are suitable for the present invention, next continuing with a detailed description of several embodiments of the apparatus and data structures of the present invention, and then further through the detailed description of the method aspects of the present invention.

I. DEFINITION OF TERMS

As used herein, the term "distributed object" or "object" refers to an encapsulated package of code and data that can be manipulated by operations through a defined interface that is associated with an object. Thus, distributed objects will be seen by those skilled in the art as including the basic properties that define traditional programming objects. However, distributed objects differ from traditional programming objects by the inclusion of two important features. First, distributed objects are multilingual. The interfaces of distributed objects are defined using an interface definition language that can be mapped to a variety of different programming languages. One such interface definition language is Object Management Group's (OMG) IDL. Second, distributed objects are location-independent, i.e., distributed objects can be located anywhere in a network. This contrasts sharply with traditional programming objects which typically exist in a single address space. Distributed objects can be object clients or object servers, depending upon whether they are sending requests to other objects or replying to requests from other objects. Requests and replies are made through an Object Request Broker (ORB) that is aware of the locations and status of the objects.

A "distributed object system" or "distributed object operating environment" refers to a system comprising distributed objects that communicate through an ORB.

An "object reference" or "objref" is an object that contains a pointer to another object. For example, the objref may contain addressing information such as a host computer network address, an ORB daemon network port address and an object identifier. The creation and definition of object references will be familiar to those skilled in the art.

A "client" as defined herein refers to an entity that sends a request to an object. In this model, the object receiving the request is referred to as a "server object" or a "target object". Thus, clients invoke operations, or implementations, from servers. In a distributed object environment, clients need not have knowledge of the implementation programming language, nor does the implementation have to have knowledge of the client's programming language due to the requirement of multilingual character of such objects. Clients and servers in distributed object environments need only communicate in terms of the interface definition language. As noted above, the request by the client to the server, and the server's reply to the client, is handled by the ORB. It should be pointed out that the client and server can exist within the same process, on the same host computer, or on two different host computers.

An "object interface" is a specification of the operations, attributes, and exceptions that an object provides. Preferably, object interfaces for distributed objects are written using IDL. As noted above, objects perform transactions through their interfaces. The use of interfaces therefore relieves the need of objects that are aware of the programming languages used to define the methods and data of the objects in the transaction.

To "marshal" a packet of information is to prepare this information for transfer over a network communications line. This often means organizing the data in a particular format in accordance with the network communications protocol being used.

To "unmarshal" a packet of information is to essentially reverse the marshaling procedure and produce data in a format which is meaningful in a non-network environment.

II. Managing Distributed Objects and Computer Processes

In a distributed object operating environment, requests and replies are made through an Object Request Broker (ORB) that is aware of the locations and status of the objects. One architecture which is suitable for implementing such an ORB is provided by the Common Object Request Broker Architecture (CORBA) specification. The CORBA specification was developed by the Object Management Group (OMG) to define the distributed computing environment world in terms of objects in a distributed client-server environment, where target objects are capable of providing services to clients requesting the service. In the following discussion, the terms "object" and "distributed object" will be used interchangeably, as the following invention is directed to both types.

According to the present invention, the ORB is responsible for managing many aspects of the distributed objects and the server processes found within the distributed object operating environment, including client-server interactions which involve calls to distributed objects. Distributed objects, as contemplated by the present invention, are implemented (by the ORB and/or the host computer) under computer processes. As is well known to those skilled in the art, computer processes provide a common framework under which computer systems function.

In actuality, a process typically includes an address space (i.e. a portion of memory allocated to only the process), a set of file descriptors, a process identification number, and one or more threads of execution (often referred to as threads). As is familiar to those skilled in the art, a single thread of execution is essentially a sequential flow of the point of execution through a process. Multi-threaded systems, such as the present invention, allow for multiple threads to run concurrently in a single process. For a more detailed description of threads, multi-threaded processes, and principles of concurrency, please see "Concurrency Within DOE Object Implementations" by Dr. Robert Hagmann, Version 0.91, May 27, 1993, published by SunSoft and incorporated herein by reference in its entirety.

As a direct result of the framework of computer processes, all entities residing under a single process will share resources (i.e. memory and files). Thus multiple target objects residing in a single process will have efficient communication with one another. Furthermore, data can be loaded into memory that all objects residing in the single process will have access to. However, programmers may have other motivations (beyond efficient transport and data sharing) which negate the advantages gained by having many objects in a single process. For instance, different objects will have different objectives and may rely on different assumptions about the process. These motivations generate a need for orderly, multi-process distributed object operating environments as disclosed by the present invention. In allowing programmers to keep objects within separate processes, the ORB may prevent conflict between and maintain the integrity of objects within processes. As a case in point, an object in a first server process may go into an error condition and begin chaotically writing within its server process memory. Nevertheless, objects running in separate server processes will remain intact since these processes have their own memory, files, and flow control.

In a preferred embodiment of the present invention, distributed objects and computer processes are resident on one or more computers linked together by a network. The network may take any suitable form. By way of example, a representative network arrangement 10 is illustrated in FIG. 1. The network arrangement 10 includes a first computer 12 which is coupled to a transmission line 14. The network 10 further includes a server, router or the like 16 in addition to other computers 18, 20, and 22 such that data and instructions can be passed among the networked computers. The design, construction and implementation of computer networks will be familiar to those of skill in the art.

Figure 2:
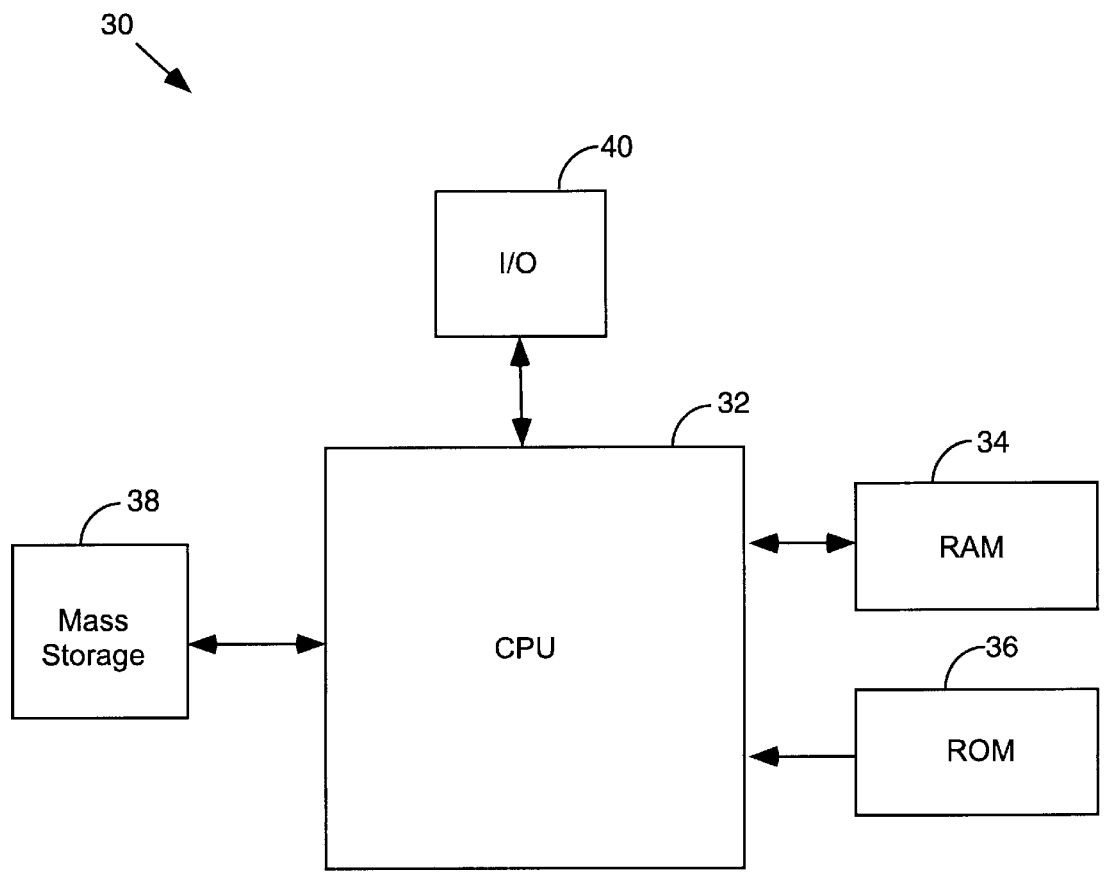
FIG. 2 illustrates diagramatically the major components of a computer in FIG. 1.

A representative computer 30 suitable for use as computers 12, 18, 20, and/or 22 of FIG. 1 is illustrated schematically in FIG. 2. Computer 30 includes a central processing unit (CPU) 32 which is coupled bidirectionally with random access memory (RAM) 34 and unidirectionally with read only memory (ROM) 36. Typically, RAM 34 is used as a "scratch pad" memory and includes programming instructions and data, including distributed objects and their associated code and state, for processes currently operating on CPU 32. ROM 36 typically includes basic operating instructions, data and objects used by the computer to perform its functions. In addition, a mass storage device 38, such as a hard disk, CD ROM, magneto-optical (floptical) drive, tape drive or the like, is coupled bidirectionally with CPU 32. Mass storage device 38 generally includes additional programming instructions, data and objects that typically are not in active use by the CPU, although the address space may be accessed by the CPU, e.g., for virtual memory or the like. Each of the above described computers optionally includes an input/output source 40 that typically includes input media such as a keyboard, pointer devices (e.g., a mouse or stylus) and/or network connections. Additional mass storage devices (not shown) may also be connected to CPU 32 through a network connection. It will be appreciated by those skilled in the art that the above described hardware and software elements, as well as networking devices, are of standard design and construction, and will be well familiar to those skilled in the art.

Returning to the discussion of the client and server, one of the underpinnings of distributed object operating environments is the interaction between the client, which is defined herein as an entity requesting a service, and a server, which is typically an object providing the service. For example, different scenarios include the client and server within the same process, in different processes on the same host computer, and on different processes running on different host computers. This client-object interaction can be discussed in terms of a client-server paradigm. By way of example, a client may be in a process running on a network computer, such as computer 12, which requests services from a target object in a different process running on a remote computer 18.

As will be appreciated by those of skill in the art, the entities which can be a client include, but are not limited to, a process running on a host computer, hereinafter referred to as a client process and a client host respectively, and an object, hereinafter referred to as a client object. Therefore, a client is any entity requesting a service, regardless of the nature of the entity. For the sake of clarity, any object providing a service is hereinafter referred to as a target object. Additionally, the computer process under which a target object resides is referred to as a server process.

Elaborating further on the terminology of client-server interactions, a client will "call" a target object to "invoke" a "method" that is executed by the target object. Note that while "call" and "invoke" can carry slightly different meanings, herein the two terms are used interchangeably and their meanings will be understood from the context of the discussion therein. Please note that the previous term "method" is a term of the art of object oriented programming and differs from the term "method" classically used in drafting patent applications. In the following discussion, the Applicant believes that it is made clear (either by context or by a hint from the Applicant) which meaning for the term "method" is used. In addition, the word "operation" is used in lieu of "object method" in the appended claims.

As is well known to those of skill in the art, an "object method" (or "method") is a procedure contained within an object which is made available to other entities, i.e. clients, for the purpose of requesting services of that object. Thus the object performing the service for the client is the server, hence the term client-server. In calling an object method, the client may also pass those arguments, also referred to as parameters, necessary for the target object to perform the requested method.

Figure 3:
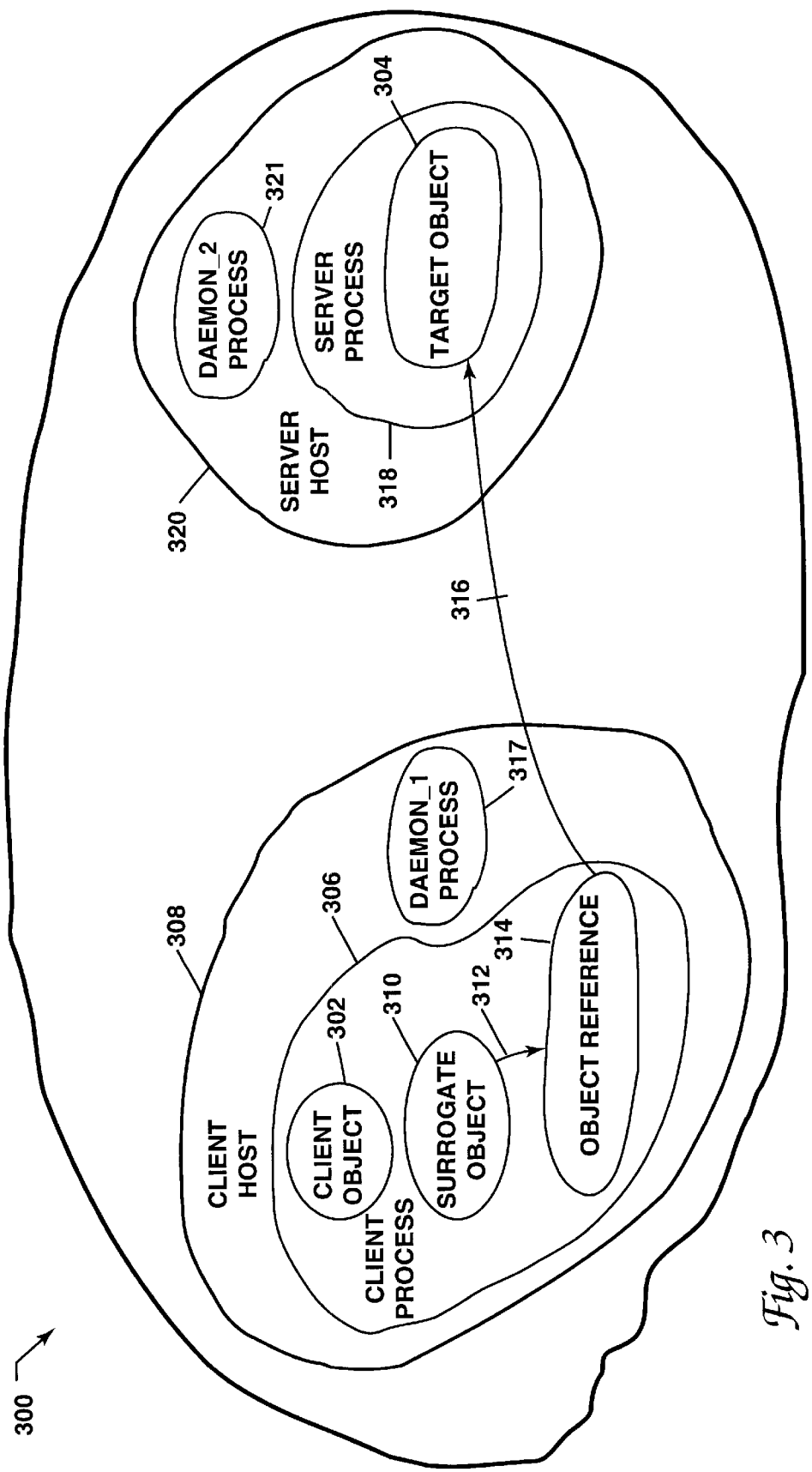
FIG. 3 is a pictorial illustration of a host-to-host client-server model showing the relationship between a client running on a client host computer and a server object running on a different, server host computer in a distributed object operating environment.
Figure 4:
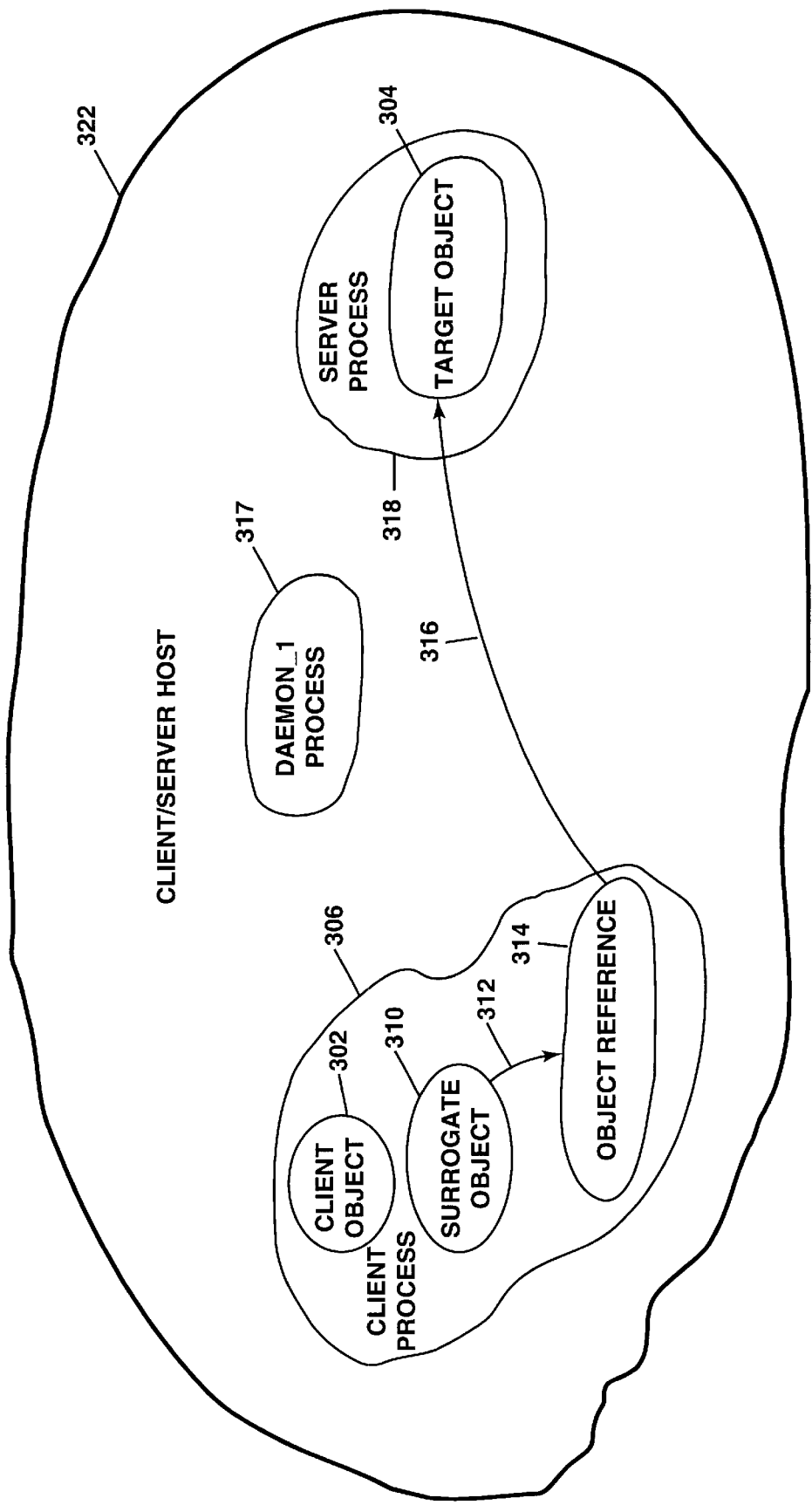
FIG. 4 is a pictorial illustration of a process-to-process client-server model showing the relationship between a client and server running in different processes on a client/server host computer.
Figure 5:
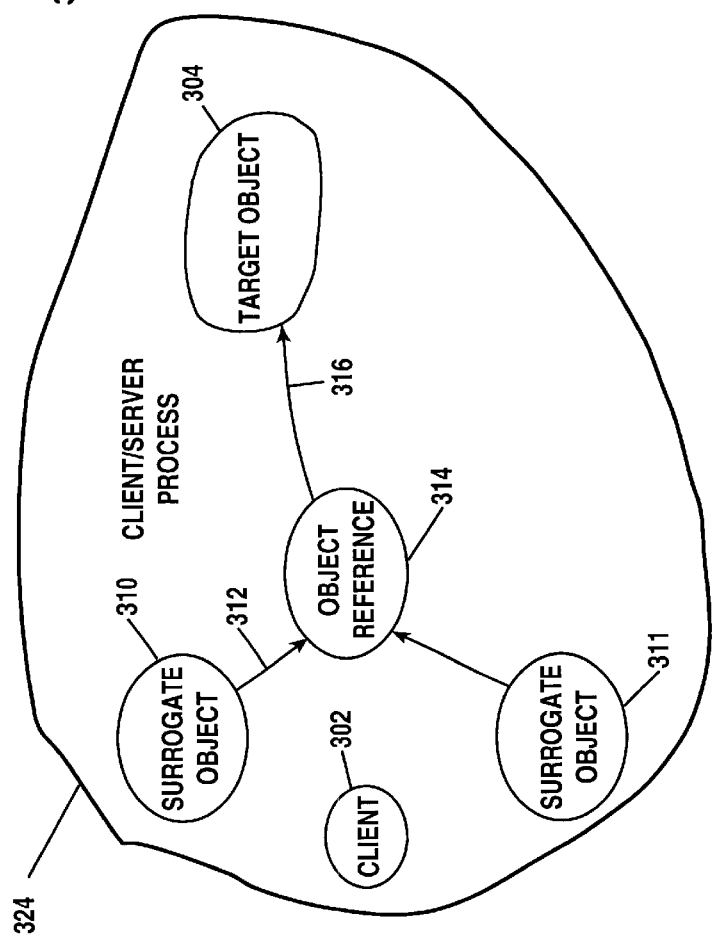
FIG. 5 is a pictorial illustration of a client-server model showing the relationship between a client and a server running in a single client/server process.

Referring next to FIGS. 3–5, a few possible enumerations of a client-server model that are very representative of a distributed object operating environment will be discussed. As is always the case, the client-server model will have a client entity, a target object, and some form of a server process. One such arrangement for implementing the following client-server models includes computers such as computer 30 of FIG. 2 interconnected over a network 14 as shown in FIG. 1. Turning first to FIG. 3, a client-server model 300 termed "host-to-host" is shown wherein client object 302 and target object 304 exist on different host computers. The client object 302 resides in a client process 306 which is executing on a client host computer 308. Client object 302 includes a surrogate object 310 which provides a first indirection 312 to an object reference 314 which in turn provides a second indirection 316 to the target object 304. In general, the surrogate object 310 resides in the client process. However, those skilled in the art will appreciate that other configurations are suitable. By way of example, the surrogate object may be a classic programming language object. Additionally there may be other surrogate objects which indirect to the single object reference 314. As used herein, an "indirection" is a set of information, a pointer, etc., which directs the client entity to a locator service which can direct the client entity to the object. By way of a descriptive analogy, if a client requested geographical directions, an indirection would point the client to the location of a current map, or perhaps provide the client with a phone number of a geographically astute individual. The idea of using an indirection (rather than direct addressing) is useful for distributed objects as certain distributed objects (those of a persistent kind) may be mobile both from process to process and host computer to host computer.

Similar to the client object 302, the target object 304 of FIG. 3 may reside in a server process 318 which is running on a server host 320. Other entities may reside on both the server host 320 and the client host 308. These entities include but are not limited to additional processes and/or objects running under the client process, the server process, and/or the additional processes. Two suitable processes are daemon_1 process 317 running on client host 308 and daemon_2 process 321 running on server host 320. Daemon processes typically run in the background and are well known to those skilled in the art.

FIG. 4 shows a "process-to-process" client-server model in which the client object 302 and the target object 304 share the same host computer, the client/server host 322. However, client object 302 and target object 304 reside within different processes. Similar to FIG. 3, the client object 302 exists in a client process 306 which is running on the client/server host 322. The client object 302 includes a surrogate object 310 which provides an indirection 312 to an object reference 314 which in turn provides an indirection 316 to the target object 304. Target object 304 exists within in a server process 318 which is running on the client/server host 322. Akin to the "host-to-host" case, further entities such as processes and/or objects may be resident on client/server host 322. One such suitable process is daemon_1 process 317.

FIG. 5 shows a client-server model in which both client object 302 and target object 304 reside within the same process, the client/server process 324. Once again, the client object 302 uses a first surrogate object 310 which holds (e.g. it has a first indirection 312 to) an object reference 314. In turn, object reference 314 provides a second indirection 316 to the target object 304. In this case the second indirection 316 may just be a pointer to shared memory. This situation is perhaps the best of all three described cases. No network communications is necessary, and since both objects are under one process, they coexist in memory allocated to the client/server process 324. In the situation of FIG. 5, other entities such as objects may be resident in client/server process 324. For example, there may be other surrogate objects present in the client process 306, such as a second surrogate object 311, which may also hold the object reference 314. However some distributed object operating environments do not include surrogate objects. In these cases, the client 302 will utilize the object reference 314 without a surrogate object.

Two other typical client-server scenarios which are not shown in the above described Figs. will now be discussed briefly. The first set of scenarios involve the instances wherein the client is not an object. As will be appreciated by those skilled in the art, the issues which arise are very similar whether the client is an object or some other entity requesting service. The other scenario is one wherein the client object and the target object are the self-same object. This may occur when an object makes a recursive call upon itself. While the recursive call may appear unusual, this client-server interaction is a fairly common and powerful tool and may be dealt with in a manner similar to the case when a client object and a target object are unique but exist in the same process.

Figure 6:
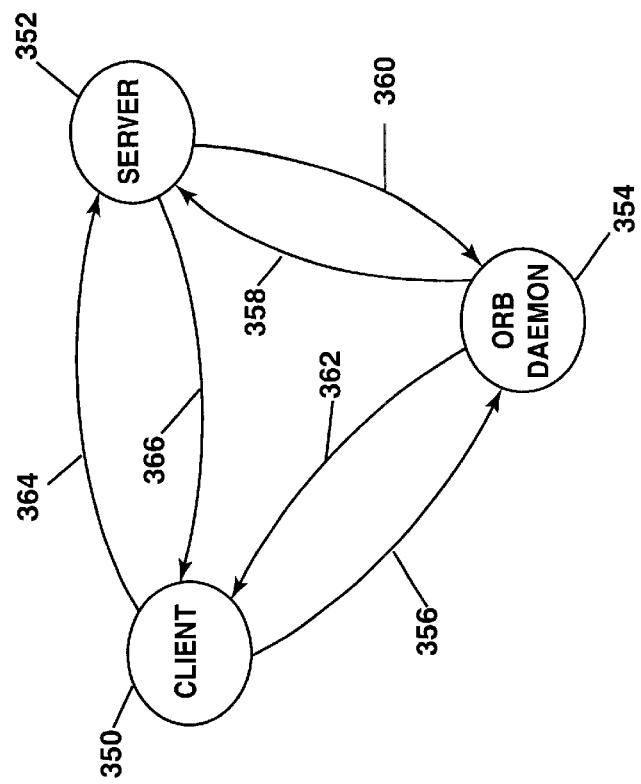
FIG. 6 is a pictorial illustration of a client-server interaction paradigm in accordance with the present invention, wherein an ORB daemon process manages server process startup and registration.

FIG. 6 is a pictorial illustration of a client-server interaction wherein an ORB daemon process manages a multiplicity of server process and target objects. FIG. 6 provides a generic paradigm for use in several specific embodiments of the present invention. The paradigm of FIG. 6 includes a client 350, a server process 352, and an ORB daemon process 354. In a step 356, client 350 calls ORB daemon process 354 to request addressing information for a target object. Then, if necessary, ORB daemon process 354 starts server process 352 in a step 358. Server process 352 corresponds to the server process for the requested target object. In a step 360, server process 352 responds to step 358 by indicating to ORB daemon process 354 that it is ready to provide services. In a step 362, ORB daemon process 354 returns addressing information to client 350. Once server process 352 is ready and client 350 has the addressing information, client 350 can call server 352 in a step 364 and server 352 can pass, in a step 366, the results of the call of step 364.

The paradigm of FIG. 6 provides a general overview of the client-server interaction in accordance with the present invention. The teaching of this invention is generally, directed to methods, apparatus, and data structures which provide mechanisms for steps 358, 360, and 362. Other steps are described in more detail in vanderbilt et. al.'s copending U.S. patent application Ser. No. 08/096,784 entitled "METHODS AND APPARATUS FOR MANAGING COLLECTIONS OF OBJECTS", which is incorporated herein by reference in its entirety.

Figure 7:
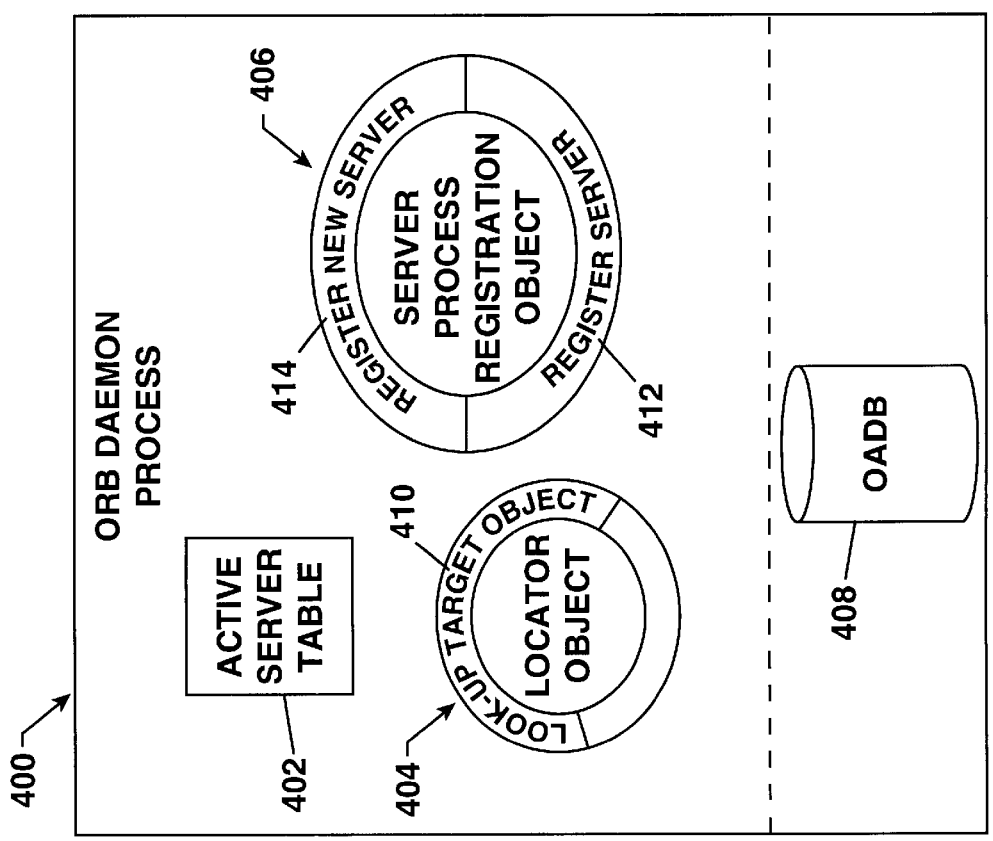
FIG. 7 is a pictorial illustration of an ORB daemon process in accordance with one embodiment of the present invention, the ORB daemon process including an active server table, a locator object, a server process registration object, and (optionally) an object adapter database.

Turning next to FIG. 7, an ORB daemon process 400 in accordance with a preferred embodiment of the present invention will now be described. ORB daemon process 400 is a background process executing on a computer system (such as computer system 30 of FIG. 2) which is part of a distributed network (such as network 10 of FIG. 1). For example, one suitable embodiment of ORB daemon process 400 may be a process such as daemon process_2 321 of FIG. 3. According to one aspect of the present invention, it is contemplated that each computer system within the distributed object operating environment has an ORB daemon process 400 resident therein.

In the embodiment of FIG. 7, ORB daemon process 400 includes an active server table 402, a locator object 404, and a server process registration object 406. Of course the ORB daemon process 400 may include a number of other objects as well as a number of threads. Locator object 404 and server process registration 406 work in conjunction to provide a locator service as described later in more detail. However, locator object 404 and server process registration object may be combined into one object which provides a locator service. An object adapter database 408 may be optionally resident in ORB daemon process 400. On the other hand, object adapter database 408 may be resident elsewhere in the distributed object operating environment. Either way, object adapter database 408 typically includes information regarding a plurality of objects such as server identifiers, target object identifiers, a correlation between server and target object identifiers, an execdef for each target object, and object references for the target objects. Locator object 404 includes an object method look-up target object 410 and server process registration object 406 includes object methods register server 412 and register new server 414. These object methods will be described in more detail immediately following the discussion of FIG. 8.

Figure 8:
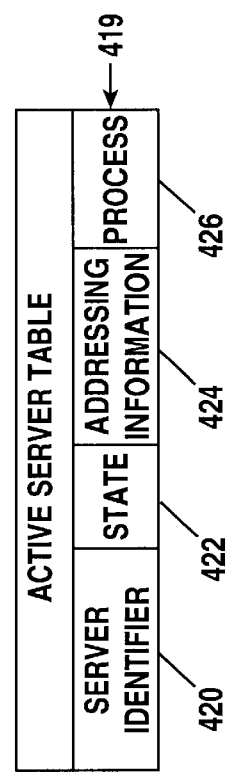
FIG. 8 is a pictorial illustration of one embodiment of a data structure for the active server table of FIG. 7, the data structure having multiple active server elements, each active server element including entries such as a server identifier, a server process state, server addressing information, and a server process identification number.

FIG. 8 shows a data structure for active server table 402 in accordance with one embodiment of the present invention. Active server table 402 is stored in memory such as RAM 34 or mass storage 38 of FIG. 2 which is allocated to ORB daemon process 400, and may be managed by one of many methods familiar to those of skill in the art. In the embodiment of FIG. 8, active server table 402 includes a plurality of server elements 419 each including entries such as server identifier 420, server process state 422, addressing information 424, and server process identification 426. Server process state 422 may be either one of "running" or "starting." However, if the client requested process is not found in the active server table 402, the server process is said to have a state of "not active."

Addressing information 424 may include a plurality of addresses for use in transport modes such as (but not limited to) local transport, shared memory transport, or remote transport. Local transport occurs within the same process and is performed by copying data within the same address space. Shared memory transport (also called "same host" transport) is performed using the host operating system inter-process communication procedures. Remote transport is performed using networking facilities. Each of these may vary depending upon factors such as the operating system and the network communication protocol. Therefore addressing information 424 may vary accordingly. The design and implementation of local, shared, and remote transport will be familiar to those skilled in the art. Modes of transport and appropriate addressing information are discussed in more detail in Brownell et. al.'s copending United State Patent Application entitled "METHODS, APPARATUS, AND DATA STRUCTURES FOR MANAGING OBJECTS", Ser. No. 08/408,317 which is incorporated herein by reference in its entirety.

Server process identification 426 is typically an identification number assigned to a process (at its incarnation) by the operating system of the host computer under which the process is running. Server process identification 426 is unique in the sense that no two server processes may exist concurrently with the same identification number. However, as there is typically a finite number of server process identification numbers (by way of example 32K is a suitable number), server process identification numbers may get recycled. Server identifier 422 differs from server process identification 426 in that server identifier 422 is assigned by the ORB and is typically forever unique within ORB daemon process 400.

Referring again to FIG. 7, one embodiment of locator object 404 has an object method entitled look-up target object 410. When a client calls locator object 404 to invoke look-up target object 410 (as in step 356 of FIG. 6), the client passes arguments which uniquely define a requested target object. Suitable arguments include data such as server identification 420 and/or a target object identifier. In response, locator object 404 will perform the requested service which in one embodiment includes the steps of determining if the server process in which the target object resides is running, forking and executing the server process if it needs to be started, and returning server process addressing information to the client once the server process is ready to receive requests (as in step 362 of FIG. 6). One method aspect of the present invention which utilizes a locator object such as locator object 404 is described in further detail below with reference to FIG. 10.

In a further embodiment, server process registration object 406 of FIG. 7 has two object methods, these being register server 412 and register new server 414. When a client calls server process registration object 406 to invoke register server 412, the client passes arguments which include a server identifier, a server process identification, and addressing information. Server process registration object 406 will store these arguments in active server table 402 and mark the server process state entry as "running" in the active server table. When a client calls server process registration object 406 to invoke register new server 414, the client passes arguments which include a server process identification, addressing information, and an object reference. In one embodiment, server process registration object 406 will get the server identifier from object adapter database 408, create a server process entry in active server table 402, store addressing information in active server table 402, mark server process state entry as "running" in active server table 402, and return the server identifier to the server process. A couple of method aspects of the present invention which utilize an object such as server process registration object 406 will be described in more detail below with reference to FIGS. 11–14.

The method aspects of the present invention are discussed primarily from the viewpoint of the server and fall into substantially two categories. In the first category, methods for management (including fork and exec, and registration) of server processes are disclosed. A few preferred embodiments of the first case are described below in reference to FIGS. 10, 12, and 13, each utilizing ORB daemon 400 of FIG. 7. In the second category, methods by which a server process starts (corresponding to the methods of FIGS. 10, 12, and 13) are disclosed. A couple of preferred embodiments are described below with reference to FIGS. 12 and 14. The need for the methods of the present invention often arise in response to a client call, even though the viewpoint of the methods is that of the server. Therefore, for the sake of clarity, the discussion of the methods of FIGS. 10–14 will be preceded by a brief discussion of the client-server interaction from the viewpoint of the client.

Figure 9:
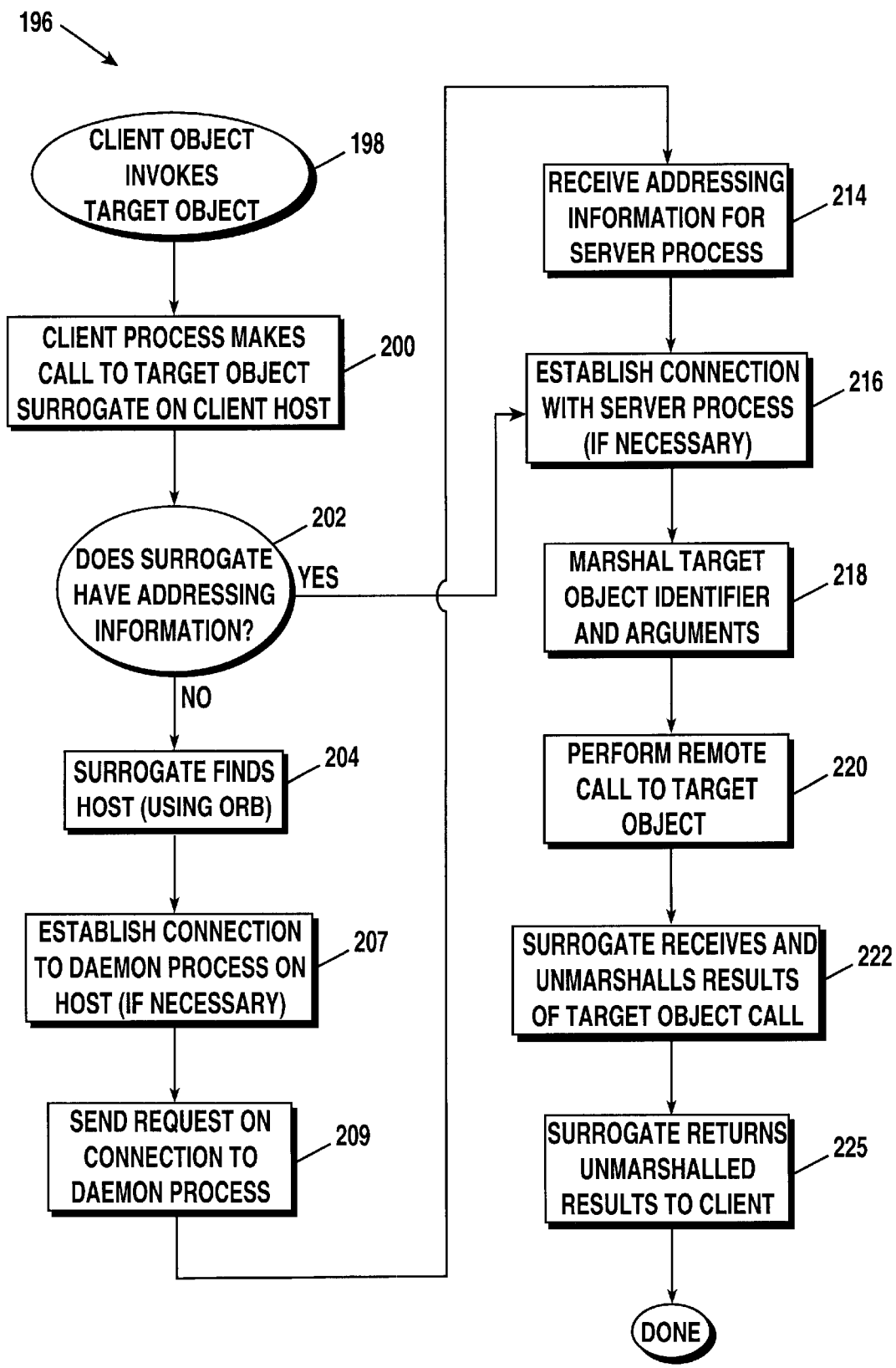
FIG. 9 is a flow chart illustrating a process executed by a client to invoke a distributed server object in accordance with one method aspect of the present invention.

Referring next to FIG. 9, a method 196 of invoking a target object in accordance with one embodiment of the present invention will be described. The target object invocation method begins in a step 198 when a client object running in a client process on the client host initiates the invocation of a target object. However, in the more general case, the client need not be an object. Typically, the client object will only have an indirection to the target object (i.e. an object reference) and will know the target object's interface requirements (or at least the portion of the interface requirements that apply to the information it is seeking). Therefore, the invocation begins when the client object calls the target object with a call that identifies the target object using the object reference and provides the arguments necessary to meet the target object's interface requirements. As illustrated in step 200, the client process responds to the client object's call with a call to the target object's surrogate which is located in the client process. Suitable methods for creating the target object surrogate and/or establishing a connection between the client object and the target object surrogate on the same machine and within the same process are known to those skilled in the art. In one example the object reference may be a pointer to the memory address of the surrogate. Typically a surrogate is created when arguments to an invocation are unmarshaled or when a reply from an invocation is unmarshaled. By way of example, a suitable method of creating the target object surrogate is described in Vanderbilt et. al.'s copending U.S. patent application Ser. No. 08/408,633 entitled "METHOD AND APPARATUS FOR DETERMINING THE TYPE OF AN OBJECT IN A DISTRIBUTED OBJECT SYSTEM" which is incorporated herein by reference in its entirety.

Once the call is received by the target object surrogate, the surrogate determines whether it already has addressing information for a target object servant existing on the server host. If the surrogate has the addressing information, then process control goes directly to a step 216 where it establishes a network connection with the server process if necessary (as will be described below in more detail). On the other hand, if the surrogate does not have addressing information for the target object servant, then this information must be obtained prior to establishing a connection. In the latter case, the target object surrogate proceeds to step 204 where it locates the server host. It should be appreciated that the server host will be identified in the object reference. Therefore, the target object surrogate may contact the ORB which will provide it with the addressing information for the ORB daemon process running on the server host.

Next, in a step 207, the target object surrogate establishes a network connection with the ORB daemon process on the server host. However, if the surrogate already has an established connection with the ORB daemon process, it may not be necessary to establish a second connection. In any event, once an appropriate connection is established, the target object surrogate requests, in a step 209, that the ORB daemon process return addressing information for the server process on which the target object servant is running. One suitable way of requesting this information is to call the locator object to invoke a look-up method. Of course, although steps 207 and 209 are logically explained as separate steps, they can be accomplished simultaneously in a single call. Methods of establishing connections between processes are well known in the art. One suitable method of establishing the aforementioned process is described in Brownell et. al.'s copending U.S. patent application Ser. No. 08/408,316 entitled "METHOD AND APPARATUS FOR MANAGING CONNECTIONS FOR COMMUNICATION AMONG OBJECTS IN A DISTRIBUTED OBJECT SYSTEM" which is incorporated herein by reference in its entirety.

In response to steps 207 and 209, the ORB daemon must start and register the server process and then return addressing information to the client. A suitable method that the server host's ORB daemon process may go through will be described below with reference to FIGS. 10–12. However, from the standpoint of the target object surrogate, it simply receives the requested server process addressing information in a step 214. With this knowledge in hand, the surrogate can establish a direct connection with the appropriate server process in step 216. Of course, it is plausible that the client process has previously established a connection with the server process for any variety of reasons such as a previous call to another target object running in this same server process. In this case, it may or may not be necessary (or desirable) to establish a second connection with the server process.

Once the connection is established in step 216, the target object surrogate will marshal the target object identifier and the arguments for the call in step 218. As used herein, to "marshal" data is to format the data in accordance with a predetermined network communication protocol (e.g. the well known TCP/IP) in preparation for network transmittal. Additionally, to "marshal" data may be to format the data in accordance with a predetermined protocol for shared memory transport. As will be appreciated by those skilled in the art, the network format and the shared memory format may be identical. The nature of the marshaling will depend entirely on the nature of the protocols used for communications on the particular network (or shared memory) that is in operation and its implementation should be apparent to those of skill in the art. Then, in a step 220, the target object surrogate performs a remote call to the target object over the connection established in step 216. As a result of this call, in a step 222, the target object surrogate receives and unmarshals the result of the target object call of step 216. Once the results have been unmarshaled, the target object surrogate returns the unmarshaled results to the client object in a step 225. The client may than use the returned results appropriately.

Figure 10:
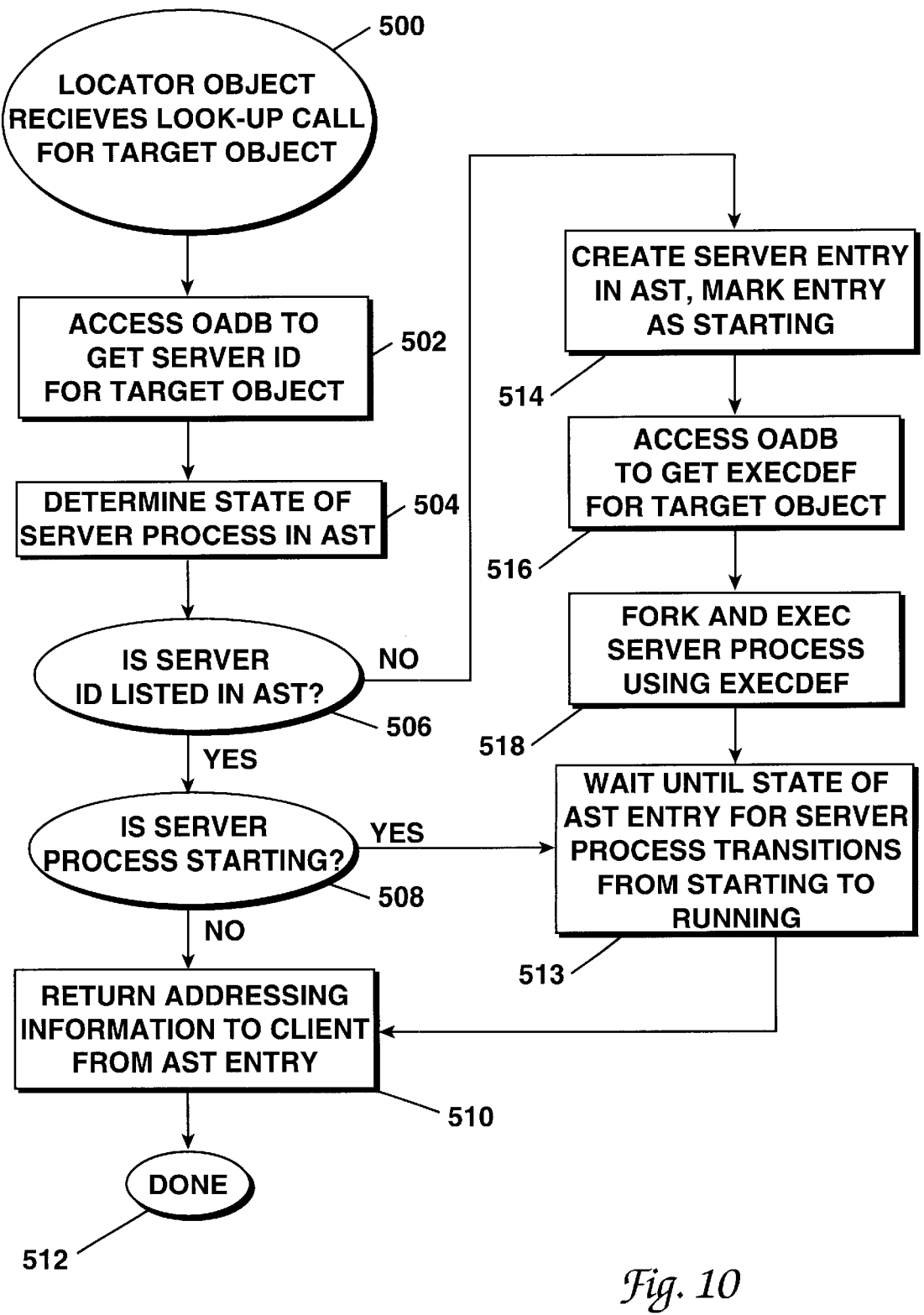
FIG. 10 is a flow chart illustrating several possible threads of execution of a locator object in accordance with another method aspect of the present invention, in this aspect the locator object is performing a service in response to a look-up invocation.

One method aspect of the present invention will be described now with respect to FIG. 10. The method of FIG. 10 is a response to step 209 of FIG. 9 and in one embodiment is performed by an ORB daemon process. The thread of execution of the method of FIG. 10 begins in a step 500 when locator object 404 receives a look-up call for the target object. Note that this look-up call is received via the ORB daemon process which (if necessary) may prepare the call for the locator object 404. For example, the ORB daemon process may unmarshal the call and any arguments. In addition to receiving this invocation, the locator object 404 will receive the necessary arguments such as the target object identifier. Next, in a step 502, locator object 404 accesses the object adapter database 408 to get a server identifier 420 that corresponds to the requested target object. In one suitable implementation, the locator object 404 searches the object adapter database 408 using the target object identifier received in step 500 as a key to find the corresponding server identifier. Once locator object 404 has the server identifier 420, it looks through an active server table 402 to determine a state of the server process in a step 504 by reading the server state entry 422. In one embodiment, the locator object 404 uses the server identifier 420 as a key to find the corresponding state entry 422 in the active server table 402. As discussed previously with respect to FIG. 8, the possible states of the server process include running, starting, and not active.

In step 506 it is determined if the server process is listed in active server table 402. If it is listed, then control branches to a step 508 where it is determined if the server process state is starting. If the server process state is not starting, then the server process is running and control proceeds to a step 510 where addressing information 424 is read from active server table 402 and then returned to the client. Note that the client may be local or remote and thus transport must be handled accordingly. For example, if the client is remote, addressing information 424 must be marshaled in preparation for network transmittal.

Traveling across the YES branch of step 508 (i.e. the server process state is starting) to a step 513, locator object 404 must wait until state entry 422 of active server table 402 transitions from starting to running. As is well known to those skilled in the art, this "wait state" may be accomplished by "locking" the thread of execution for locator object 404. In step 513 the thread is locked until the server process state is running. Note that the server process may be running or starting even if the currently requested target object has not previously been requested. This is because the present invention teaches that multiple objects may reside under a single process. The present invention enables this feature by checking and managing server processes so that redundant processes are not necessarily started for each requested target object. In any event, once the server process is running, control proceeds to step 510 where addressing information is returned to the client. Once again, the addressing information may be marshaled in preparation for network transmittal.

If the target object requested in step 500 was a legitimate, existing target object, then a corresponding server identifier will be found in the object adapter database 408. However, it is possible that no clients have previously requested a target object which resides in the server process corresponding to this server process identifier. In this case, the server process is not active and its server identifier will not be listed in the active server table 402. Thus the server process state is said to be not active. Accordingly, proceeding across the NO branch of step 506 (i.e. server identifier is not listed in active server table 402), in a step 514 locator object 404 creates a server process entry in active server table 402 and marks server process state 422 as starting. By marking the state as starting, the locator object 514 prevent errors which may occur if another client were to make a request which involved this server process.

Next, in a step 516, locator object 404 accesses object adapter database 408 to get the execdef for the target object. In other embodiments, the execdef may be obtained during other steps such as step 502. In explanation, the execdef may be thought of as a startup procedure for the server process. For example, an execdef may include a directory path, an executable filename, and a list of arguments. Once locator object 404 has the execdef for the target object, it proceeds to "fork and exec" the server process in a step 518 using the execdef. That is, a new thread of execution for a new process offshoots from the thread of FIG. 10 and proceeds to execute the program listed as the executable filename, hence the phrase "fork and exec." This phrase will be familiar to those of skill in the art. After the fork and exec of step 518, the locator object 404 proceeds to step 513 wherein it must wait until server process state entry 422 of active server table 402 transitions from starting to running. Once the server process is running, control proceeds to step 510 where addressing information is returned to the client.

In any event, once the addressing information is returned to the client in step 510, control proceeds to a step 512 where the operation look-up target object is complete. Additional embodiments of the method of FIG. 10 are envisioned. In particular, there may be additional states corresponding to the server process state 422 such as "unavailable" or "non-existent." In either case, appropriate steps such as returning an error message to the client may be performed by locator object 404. Another state may be "forward all requests." In this case, the locator object 404 may return addressing information for a "replacement" target object and/or server process.

Other variations on the method of FIG. 10 are envisioned. During normal operation of a distributed object operating environment there may arise situations wherein the target object and/or server process may be temporarily (or permanently) unavailable. For example, maintenance operations such as backing up, fixing code, or installing new objects may disable the target object and/or server process. According to one embodiment of the present invention, there may be three possible states: long hold down, short hold down, and no hold down. In the case of no hold down, both the target object and the server process are available and the locator object 404 thread of execution may proceed exactly as described in reference to FIG. 10. In the case of short hold down, the thread of execution is blocked temporarily, similar to step 513 of FIG. 10. This case would be appropriate if the delay was relatively short. In the case of long hold down, an error message would be returned to the client. This would be appropriate if the target object and/or server process was permanently unavailable, or unavailable for a relatively long period of time. One suitable place to store the hold down information is within the execdef. Then, step 504 of FIG. 10 could be expanded to further include the step of determining the hold down and performing the appropriate steps.

Figure 11:
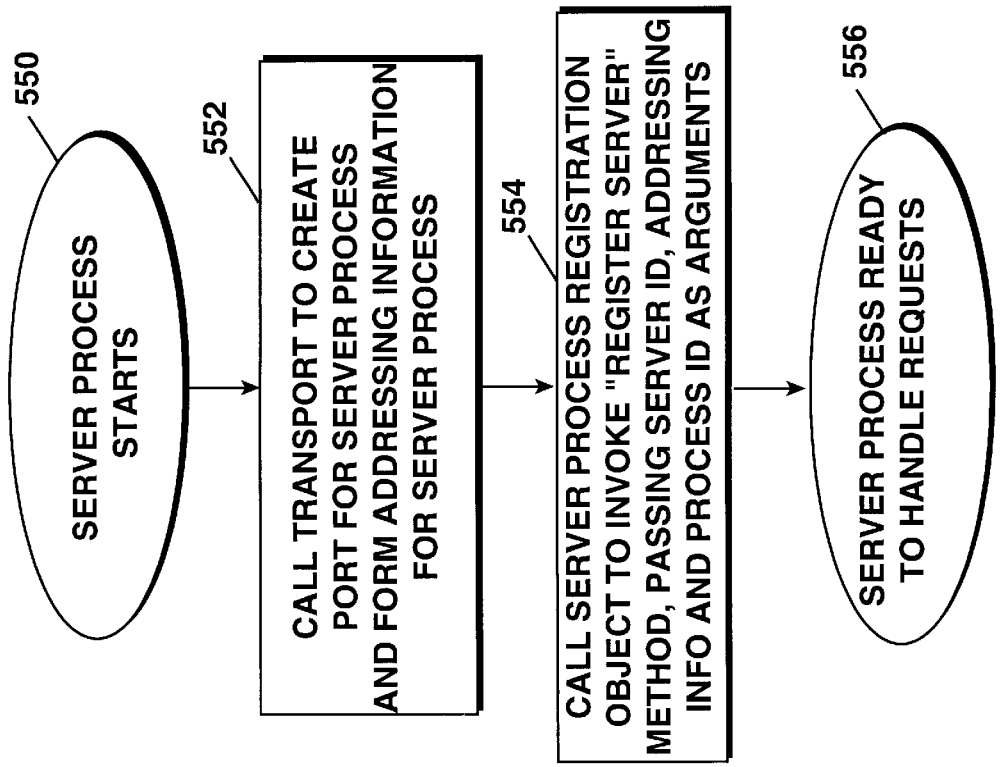
FIG. 11 is a flow chart illustrating a thread of execution of a server process starting up in accordance with a further method aspect of the present invention.

Referring next to FIG. 11, a method of starting a server process in accordance with one embodiment of the present invention will now be described. By way of example, the server process may start in a step 550 in response to the fork and exec step 518 of FIG. 10. Next, in a step 552, the server process calls a transport service to create a communications port and form its addressing information for the server process. As will be appreciated by those skilled in the art, the transport service may be implemented as part of the host computer operating system or as part of the distributed object operating environment. Then, in a step 554, the server process calls the server process registration object 406 to invoke the register server operation, passing server identifier 420, addressing information 424, and server process identification 426 as arguments. With this information the server process registration object 406 can uniquely register the server process as described in further detail below with respect to FIG. 12, thereby perpetuating the advantages of the present invention. Once this call is made and the server process is registered, the server process is ready to handle requests in a step 556.

Figure 12:
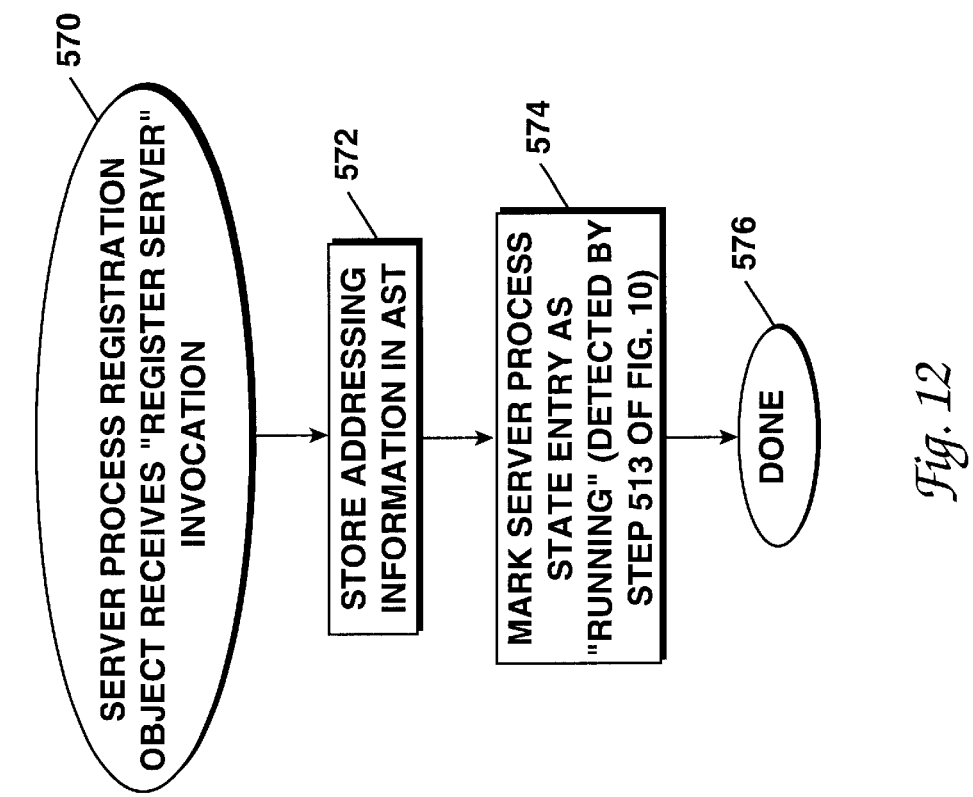
FIG. 12 is a flow chart illustrating a thread of execution of a server process registration object in accordance with yet another method aspect of the present invention, in this aspect the server process registration object is performing a service in response to a register server invocation.

Turning now to FIG. 12, a method of registering a server process in an active server table 402 in accordance with one embodiment of the present invention will be described. By way of explanation, a server process registration object may perform the registration in response to an invocation as in step 554 of FIG. 11. In a step 570, server process registration object 406 receives a register server invocation which includes arguments such as server identifier 420, addressing information 424, and server process identification 426. Next, in a step 572, server process registration object 406 stores addressing information 424 in active server table 402. Note that an entry for this server process (identifying it by server identifier 420) was created in a step such as step 514 of FIG. 10. Then, in a step 574, server process registration object 406 marks server process state 422 as running. Once the state is marked running, server process registration object 406 has completed the requested service and is done in a step 576.

As will be appreciated, the methods of FIGS. 9–12 may all be woven into one client-server interaction encompassing the steps 356–362 as described in reference to the client-server paradigm of FIG. 6. Each of the FIGS. 9–12 may be interpreted to describe a separate thread of execution, and one embodiment of the present invention may be implemented this way. Additionally, these threads may be collapsed into a single thread for implementation on a single-threaded system. The advantages of different threading schemes, as well as their implementation and construction, will be well familiar to those skilled in the art. Alternatively, various embodiments would provide methods for the different client-server interactions described above with reference to FIGS. 3–5. In light of the preceding it will be apparent to those skilled in the art how to construct and implement these and still further embodiments, all which fall within the scope of the present invention.

Underlying the above discussion of FIGS. 9–12 was the assumption that an ORB daemon process 400 started a server process. However, this is not always the case. For instance, a client may pass a call directly to the target object yet the target object and/or the server process may not be active. In another instance, a distributed object and/or its corresponding server process may wish to activate due to one of many other causes (e.g. a particular object and/or process always executes at power up). In either instance, a mechanism is required for server processes to "self-start" (i.e. start-up and register) themselves. A couple of methods relating to self-starting servers are described below with respect to FIGS. 13 and 14.

Figures 13, 14:
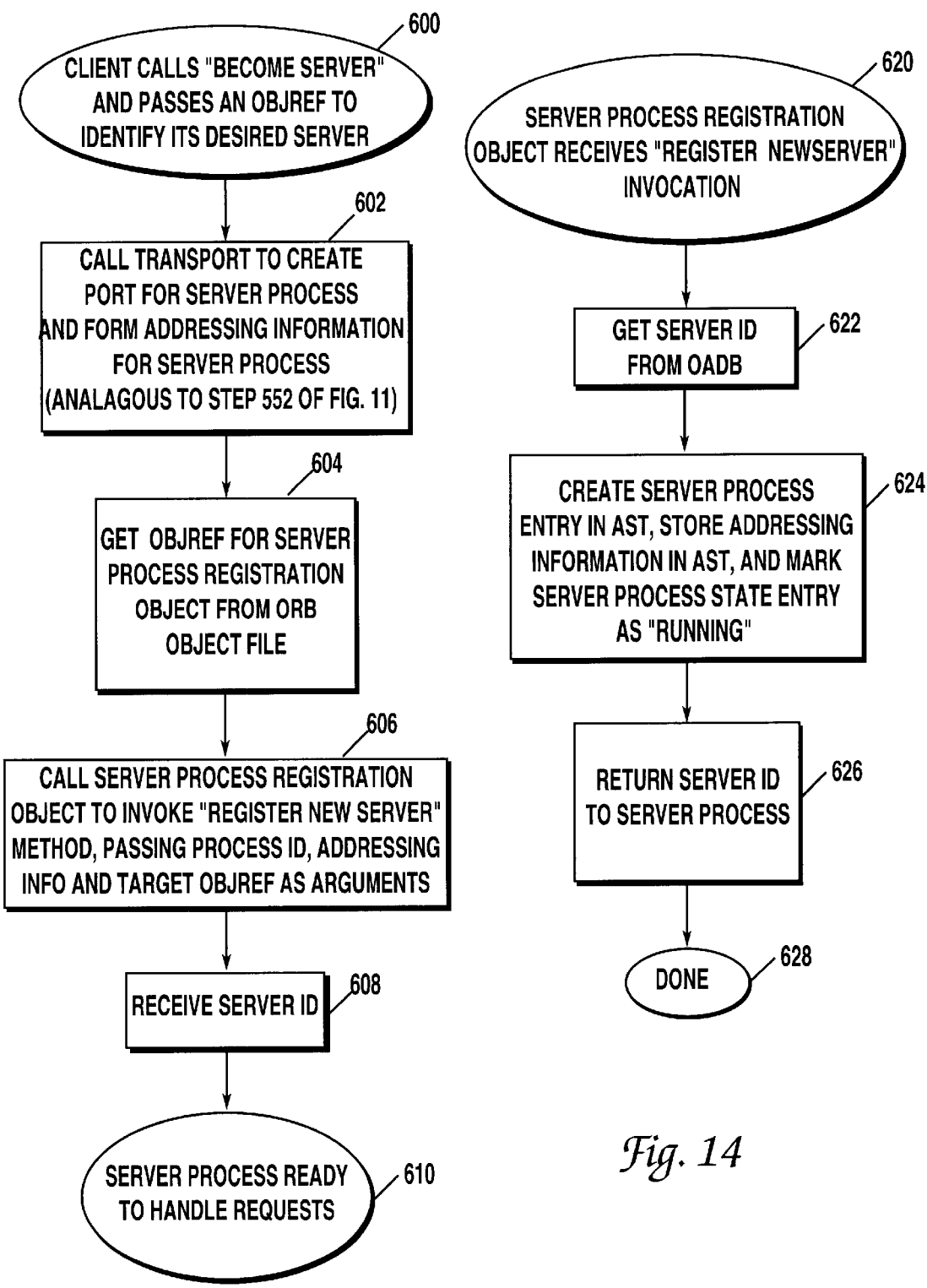
FIG. 13 is a flow chart illustrating a thread of execution of a server process "self-starting" in accordance with a separate method aspect of the present invention.
FIG. 14 is a flow chart illustrating a thread of execution of a server process registration object in accordance with another separate method aspect of the present invention, in this aspect the server process registration object is performing a service in response to a register new server invocation.

Referring to FIG. 13, a method for a server process to self-start (i.e. start and register itself) in accordance with one embodiment of the present invention will be discussed. In a first step 600, a client calls to invoke an object method which can roughly be described as "become server." In one embodiment the client also passes an object reference to identify the desired target object and thereby designate the corresponding server process. In other embodiments, the initial step 600 may simply correspond to an object self initiating its self-start. In any event, after initial step 600, the object, in a step 602, calls transport to create a port for the server process and form addressing information for the server process. Again, the addressing information may include addresses for remote, shared memory, and local modes of transport. Note that step 602 is analogous to step 552 of FIG. 11.

Once the server process addressing information is formed, the server process needs to register with the ORB daemon process. Therefore, in a step 604, the server process gets the object reference for server process registration object 406. The object reference for the server process registration object 406 provides the indirection necessary for communication with the server process registration object 406. By way of example, the server process may use the ORB to obtain this object reference. Once it has the object reference, the server process, in a step 606, calls server process registration object 406 to invoke object method register new server 414 and passes server process identification 426, addressing information 424, and the object reference for the target object as arguments. If the server process knows its server identifier 420, then it may pass this in lieu of the object reference for the target object. One embodiment of the server process registration object's response to this invocation is described below with respect to FIG. 14. Then (if necessary), in a step 608, the server process receives back its server identifier 420 from the server process registration object 406. Thus the server process is registered, uniquely defined, and ready to handle requests in a step 610.

Turning now to FIG. 14, one method for a server process registration object 406 to register a new object will be discussed. In a step 620, server process registration object 406 receives a register new server 414 invocation with arguments including server process identification 426, addressing information 424, and the object reference for the target object. By way of example, this invocation may have been generated by step 606 of FIG. 13. Next, in a step 622, server process registration object 406 uses the object reference for the target object to get server identifier 420 from object adapter database 408. Then, in a step 624, server process registration object 406 performs the steps of: creating server process entry in active server table 402; storing addressing information 424 in active server table 402; and making server process state entry 422 as running. Now the new server process is registered and in a step 626 server process registration object 406 passes server identifier 420 to the server process. Note that step 626 sends the information that is received in step 608 of FIG. 13. Then, the method of FIG. 14 is complete in a step 628.

Although only a few embodiments of the present invention have been described, it should be understood that the present invention may be embodied in many other specific forms without departing from the spirit or scope of the invention. The client-server models discussed with reference to FIGS. 3–5 are only samples and in no way should be construed as limiting. By way of example, the "host-to-host" model could be extrapolated to include multiple target objects. That is, the first target object 304 could simply be an object reference which indirects to another target object, perhaps in another distributed object environment. Thus multiple server processes may get started as a result of the initial request for service. Or, the first target object could perform a portion of the requested service and then make its own call to a second target object before responding to the first client object 302. As will be appreciated, the possible enumerations take on many embodiments, all of which fall within the scope of the present invention. Furthermore, each of these instances can be managed by the disclosed ORB daemon process through various embodiments which will be apparent to those skilled in the art.

The data structure and location of active server table 402 may be varied greatly and yet fall within the scope of the present invention. As a first example, active server table 402 may be located in a process separate from ORB daemon process. Additionally, the information stored in active server table 402 could be maintained in object adapter database 408 and vice versa. Furthermore, different distributed object operating environments may have different requirements for uniquely identifying server processes. In these cases, the entries in active server table 402 may expanded and/or contracted accordingly. Still further, each of these may require a specific arrangement of the described data structures. Construction and implementation of each of these numerous embodiments will be apparent to those skilled in the art.

As will be appreciated by those skilled in the art of distributed object systems, the underlying ideas behind the described methods of managing server processes and target objects can be implemented in a wide variety of alternative embodiments, of which there far too many to discuss in detail. However, since the underlying philosophy has been described, various alternatives will be clear to those skilled in the art. By way of example, the object methods contained in locator object 404 and server process registration object 406 may be spread over several additional objects or combined into one object which could be termed the locator service. Additionally, other process for execution control (besides threads) may be used to implement the present invention.

Therefore, the present examples are to be considered as illustrative and not restrictive, and the invention is not to be limited to the details given herein, but may be modified within the scope of the appended claims.

What is claimed is:

1. A daemon process for use on a computer system in a distributed object operating environment, said distributed object operating environment including a plurality of distributed objects which are intended to reside in a corresponding plurality of server processes, said daemon process operable to manage that portion of said plurality of distributed objects which reside on said computer system and that portion of said plurality of server processes which execute on said computer system, said daemon process including:

an active server table arranged to maintain entries regarding a plurality of server processes, said entries including a server identifier, a server process state, and server process addressing information, wherein each server process that is active on said computer system has an entry in said active server table and a first active server process has at least one target object capable of providing service; and a locator service operable to access said active server table to provide server process addressing information for said plurality of server processes, said locator service further operable to register a server process in said active server table, wherein a client residing on a remote computer system, when requesting services of said target object, invokes said target object indirectly by invoking a surrogate object corresponding to said target object, said surrogate object residing on said remote computer system, said surrogate object operable to establish a connection with said daemon process in order to obtain addressing information of said first active server process from said daemon process.

2. A daemon process as described in claim 1 further including an object adapter database, said object adapter database including:
- a plurality of target object identifiers;
- a plurality of server identifiers, each server identifier corresponding to at least one of said plurality of target object identifiers; and
- a plurality of object references, each object reference corresponding to one of said plurality of target object identifiers.

3. A daemon process as described in claim 1 wherein said locator service includes a locator object arranged to perform said operation of accessing said active server table to provide server process addressing information, said operation performed in response to a request from a client.

4. A daemon process as described in claim 1 wherein said locator service includes a server process registration object arranged to perform said operation of registering a server process in the active server table.

5. A distributed object operating environment comprising:
- a plurality of computer systems;
- a computer network interconnecting said plurality of computer systems; and
- at least one daemon process as recited in claim 1.

6. A computer system for use in a distributed object operating environment, said computer system comprising:
- a central processing unit;
- a memory accessible by said central processing unit, said memory including a plurality of distributed objects; and
- a locator service implemented on said computer system that manages said plurality of distributed objects and a plurality of server processes which may be implemented on said computer system, said locator service operable to initiate startup of said plurality of server processes,
- wherein a first client residing on a remote computer system, when requesting services of a first target object being a one of said distributed objects, invokes said target object indirectly by invoking a surrogate object corresponding to said target object, said surrogate object residing on said remote computer system, said surrogate object operable to establish a connection with said locator service in furtherance of establishing communication with said target object and, if a first server process wherein said target object is intended to reside is not yet active, said locator service initiates startup of said first server process.

7. A computer system as recited in claim 6 further including an input/output device which may communicate with said distributed object operating environment and wherein said locator service includes:
- a computer implemented receiver for receiving a look-up call for a target object from a client, said look-up call received via said input/output device;
- a computer implemented mechanism for obtaining a server identifier for said target object;
- a computer implemented evaluator for determining a state of a server process corresponding to said target object, said server process uniquely defined within said computer system by said server identifier, said state of server process being one of the group consisting of running, starting, and not active; and
- a computer implemented transmitter for returning addressing information corresponding to said server process to said client, said addressing information returned via said input/output device.

8. A computer system as recited in claim 7 wherein said transmitter is arranged to operate immediately upon said evaluator determining that said state is running.

9. A computer system as recited in claim 7 further including a wait device operable to wait until said state transitions from starting to running.

10. A computer system as recited in claim 7 wherein said mechanism for obtaining a server identifier for said target object is operable to access a first database stored in said memory to obtain said server identifier.

11. A method as recited in claim 10 wherein said first database is an object adapter database.

12. A computer system as recited in claim 10 wherein said evaluator is operable to look up said state in a second database stored in said memory.

13. A computer system as recited in claim 12 wherein said second database is an active server table.

14. A computer system as recited in claim 12 wherein said first and second database are the same database.

15. A computer system as recited in claim 12 further including:
- a computer implemented creator for creating a server process entry in said second database, said server process entry including a server identifier and a server process state;
- a computer implemented marking device for marking said server process state as starting in said second database;
- a computer implemented accessing device for accessing said first database to get an execdef for said target object;
- a computer implemented starter for starting said server process using said execdef for target object; and
- a computer implemented wait device operable to wait until said server process state for said server process transitions from starting to running.

16. A computer system as recited in claim 15 wherein said server process includes:
- a second computer implemented receiver for receiving a server process identification number from an operating system of said computer system;
- a computer implemented communications port creator for creating a communications port for said server process;
- a computer implemented address device for forming addressing information for said server process;
- a second computer implemented transmitter for calling a server process registration object resident in said daemon process, said call operable to invoke a register server operation, said call passing said addressing information, said server process identification number, and said server identifier to said server process registration object.

17. A computer system as recited in claim 16 wherein said server process registration object includes:
- a register server operation receiver for receiving a call invoking said register server operation;
- a database device for storing said addressing information in said second database; and
- a state marking device for marking said server process state entry as running.

18. A distributed object operating environment comprising:

a plurality of computer systems wherein at least one of said plurality of computer systems is a computer system as recited in claim 6; and a computer network interconnecting said plurality of computer systems.

19. A computer system for use in a distributed object operating environment, said distributed object operating environment providing clients access to the services of remote distributed objects through the use of surrogate objects, said computer system comprising:

a central processing unit;

a memory accessible by said central processing unit;

a forking mechanism to fork a new thread of execution from a thread of execution executing on said computer system;

a daemon process implemented on said computer system, said daemon process including a server process registration object and an active server table, wherein said server process registration object is operable to perform a register server operation including registering a new server process in said active server table; and a server process implemented on said computer system, said server process including:

a first device for receiving a server process identification number from an operating system of said computer system;

a second device for creating a communications port for said server process;

an address device for forming addressing information for said server process; and a register server transmitter for calling the server process registration object to invoke said register server operation, said call passing said addressing information, said server process identification number, and said server identifier to said server process registration object.

20. A computer implemented method for managing a plurality of server processes which are intended to execute on a computer system, said computer system for use in a distributed object operating environment, said distributed object operating environment providing clients access to the services of remote distributed objects through the use of surrogate objects, said method performed by a daemon process resident on said computer system, said method comprising the steps of:

receiving under computer control a look-up call for a target object, said look-up call originating from a client, wherein when said client resides on a remote computer system, said client originates said look-up call indirectly by invoking a surrogate object corresponding to said target object, said surrogate object residing on said remote computer system;

determining under computer control a state of a server process corresponding to said target object, said server process uniquely defined within said computer system by said server identifier; and returning under computer control addressing information corresponding to said server process to said client, wherein when said client resides on a remote computer, said surrogate object is the recipient of said addressing information.

21. A method as recited in claim 20 wherein said state is determined to be running and therefore said step of returning addressing information is performed immediately.

22. A method as recited in claim 20 wherein said state is determined to be starting and therefore said method further includes a step of waiting under computer control until said state transitions from starting to running, said waiting step performed prior to the step of returning addressing information.

23. A method as recited in claim 20 wherein the step of obtaining a server identifier for said target object includes accessing under computer control a first database.

24. A method as recited in claim 23 wherein said first database is an object adapter database.

25. A method as recited in claim 23 wherein the step of determining a state of a server process includes looking up under computer control said state in a second database.

26. A method as recited in claim 25 wherein said second database is a active server table.

27. A method as recited in claim 25 wherein said first and second database are the same database.

28. A method as recited in claim 25 wherein said server process is not listed in said second database and therefore the method further includes the following steps performed prior to said return addressing information step:

creating under computer control a server process entry in said second database, said server process entry including a server identifier and a server process state;

marking under computer control said server process state as starting in said second database;

accessing under computer control said first database to get an execdef for said target object;

starting under computer control said server process using said execdef for target object; and waiting under computer control until said server process state for said server process transitions from starting to running.

29. A method as recited in claim 28 wherein said server process responds to said step of starting said server process by performing the steps of:

receiving under computer control a server process identification number from an operating system of said computer system;

creating under computer control a communications port for said server process;

forming under computer control addressing information for said server process;

calling under computer control a server process registration object resident in said daemon process, said call operable to invoke a register server operation, said call passing said addressing information, said server process identification number, and said server identifier to said server process registration object.

30. A method as recited in claim 29 wherein said server process registration object performs the steps of:

receiving under computer control a call invoking said register server operation;

storing under computer control said addressing information in said second database; and marking under computer control said server process state entry as running.

31. A computer implemented method for a server process executing on a computer system, said server process having a server identifier, said computer system for use in a distributed object operating environment, said distributed object operating environment capable of providing clients access to the services of remote distributed objects through the use of surrogate objects, said method comprising the steps of:

receiving under computer control a server process identification number from an operating system of said host computer;

creating under computer control a communications port for said server process;

forming under computer control addressing information for said server process;

calling under computer control a server process registration object resident in a certain process executing on said computer system, said call operable to invoke a register server operation, said call passing said addressing information, said server process identification number, and said server identifier to said server process registration object, wherein when said server process is registered due to said invocation of said register server object, said certain process provides a mechanism enabling clients of said server process to obtain said addressing information, said server process identification number, and said server identifier upon request.

32. A computer implemented method for registering an active server process, said method performed by a server process registration object resident in a certain process executing on a computer system, said computer system for use in a distributed object operating environment, said distributed object operating environment providing clients access to the services of remote distributed objects through the use of surrogate objects, said method comprising the steps of:

receiving under computer control a call invoking a register server operation operable to register the active server process in an active server table, said call including a server process identification number, a server identifier corresponding to said server process identification number, and addressing information corresponding to said server identifier;

storing under computer control said addressing information in a database; and marking under computer control a server process state entry in said database as running, wherein when said active server process is registered due to said invocation of said register server process, said certain process provides a mechanism enabling clients of said server process to obtain said addressing information, said server process identification number, said server identifier, and said server process state entry.

33. A computer implemented self-start and provide service method for a server process executing on a computer system, said computer system for use in a distributed object operating environment, said distributed object operating environment providing clients access to the services of remote distributed objects through the use of surrogate objects, said server process working in conjunction with a daemon process executing on said computer system, said method comprising the computer controlled steps of:

receiving at said server process a become server invocation from a first client;

receiving at said server process an object reference for a target object;

receiving at said server process a server process identification number from an operating system of said computer system;

creating with said server process a communications port for said server process;

forming with said server process addressing information for said server process;

obtaining with said server process an object reference for a server process registration object from an object request broker, said server process registration object residing in said daemon process;

calling with said server process said server process registration object, said call operable to invoke a register new server operation, said call passing said addressing information, said server process identification number, and said object reference for said target object to said server process registration object;

receiving at said server process a server identifier corresponding to said server process receiving at said daemon process a look-up call for said target object, said look-up call originating from a second client, wherein when said second client resides on a remote computer system, said second client originates said look-up call indirectly by invoking a surrogate object corresponding to said target object, said surrogate object residing on said remote computer system;

determining with said daemon process a state of said server process corresponding to said target object, said server process uniquely defined within said computer system by said server identifier, and returning under computer control addressing information corresponding to said server process to said client, wherein when said client resides on a remote computer, said surrogate object is the recipient of said addressing information.

34. A computer implemented method for a server process registration object in response to a call invoking a register new server operation as recited in claim 33, said method including the steps of:

obtaining under computer control a server identifier from an object adapter database;

creating under computer control a server process entry in an active server table;

storing under computer control said addressing information in said active server table;

marking under computer control a server process state entry in said active server table as running; and sending under computer control said server identifier to said server process.

* * * * *